United States Patent
Watanabe

(10) Patent No.: US 9,947,296 B2
(45) Date of Patent: Apr. 17, 2018

(54) DISPLAY DEVICE, DISPLAY METHOD, PROGRAM

(75) Inventor: Yasuhiko Watanabe, Kanagawa (JP)

(73) Assignee: NEC Corporation, Tokyo (JP)

( * ) Notice: Subject to any disclaimer, the term of this patent is extended or adjusted under 35 U.S.C. 154(b) by 42 days.

(21) Appl. No.: 14/009,960

(22) PCT Filed: Feb. 21, 2012

(86) PCT No.: PCT/JP2012/054053
§ 371 (c)(1),
(2), (4) Date: Oct. 4, 2013

(87) PCT Pub. No.: WO2012/137549
PCT Pub. Date: Oct. 11, 2012

(65) Prior Publication Data
US 2014/0028724 A1    Jan. 30, 2014

(30) Foreign Application Priority Data
Apr. 6, 2011    (JP) .................................. 2011-084468

(51) Int. Cl.
G09G 5/00    (2006.01)
G09G 5/34    (2006.01)
G06F 1/16    (2006.01)

(52) U.S. Cl.
CPC .............. *G09G 5/34* (2013.01); *G06F 1/1601* (2013.01); *G09G 5/00* (2013.01); *G06F 2200/1614* (2013.01); *G09G 2340/0442* (2013.01); *G09G 2340/0492* (2013.01); *G09G 2354/00* (2013.01)

(58) Field of Classification Search
None
See application file for complete search history.

(56) References Cited

U.S. PATENT DOCUMENTS

| 2005/0052471 A1* | 3/2005 | Nagasaki | G06F 1/1626 345/649 |
|---|---|---|---|
| 2006/0284855 A1 | 12/2006 | Shintome | |
| 2008/0129666 A1 | 6/2008 | Shimotono et al. | |

(Continued)

FOREIGN PATENT DOCUMENTS

| CN | 101883175 | 11/2010 |
|---|---|---|
| JP | 2004-240878 | 8/2004 |

(Continued)

OTHER PUBLICATIONS

Extended European Search Report issued by the European Patent Office for European Application No. 12768543.6 dated Jul. 18, 2014 (7 pgs.).

(Continued)

*Primary Examiner* — Xiao Wu
*Assistant Examiner* — Mohammad H Akhavannik
(74) *Attorney, Agent, or Firm* — Wilmer Cutler Pickering Hale and Dorr LLP

(57) ABSTRACT

A display device according to the present invention includes an input unit that receives an operation instruction, a display unit that displays a screen, a changer that changes a displayed direction of the screen displayed by the display unit, and a stopper that stops the displayed direction of the screen from being changed by the changer if the input unit has received an operation instruction about information on the screen displayed by the display unit.

4 Claims, 4 Drawing Sheets

(56) References Cited

U.S. PATENT DOCUMENTS

| | | | |
|---|---|---|---|
| 2008/0165144 A1* | 7/2008 | Forstall | G06F 1/1626 345/173 |
| 2008/0211778 A1 | 9/2008 | Ording et al. | |
| 2010/0265269 A1 | 10/2010 | Matsuda | |
| 2010/0285844 A1 | 11/2010 | Hosoi | |
| 2011/0216064 A1* | 9/2011 | Dahl | G06F 1/1616 345/428 |
| 2013/0162654 A1* | 6/2013 | Borovsky | G06T 13/00 345/474 |

FOREIGN PATENT DOCUMENTS

| | | |
|---|---|---|
| JP | 2006-350814 | 12/2006 |
| JP | 2009-300884 | 12/2009 |
| JP | 2010-263433 | 11/2010 |

OTHER PUBLICATIONS

International Search Report corresponding to PCT/JP2012/054053, dated May 29, 2012, 3 pages.

\* cited by examiner

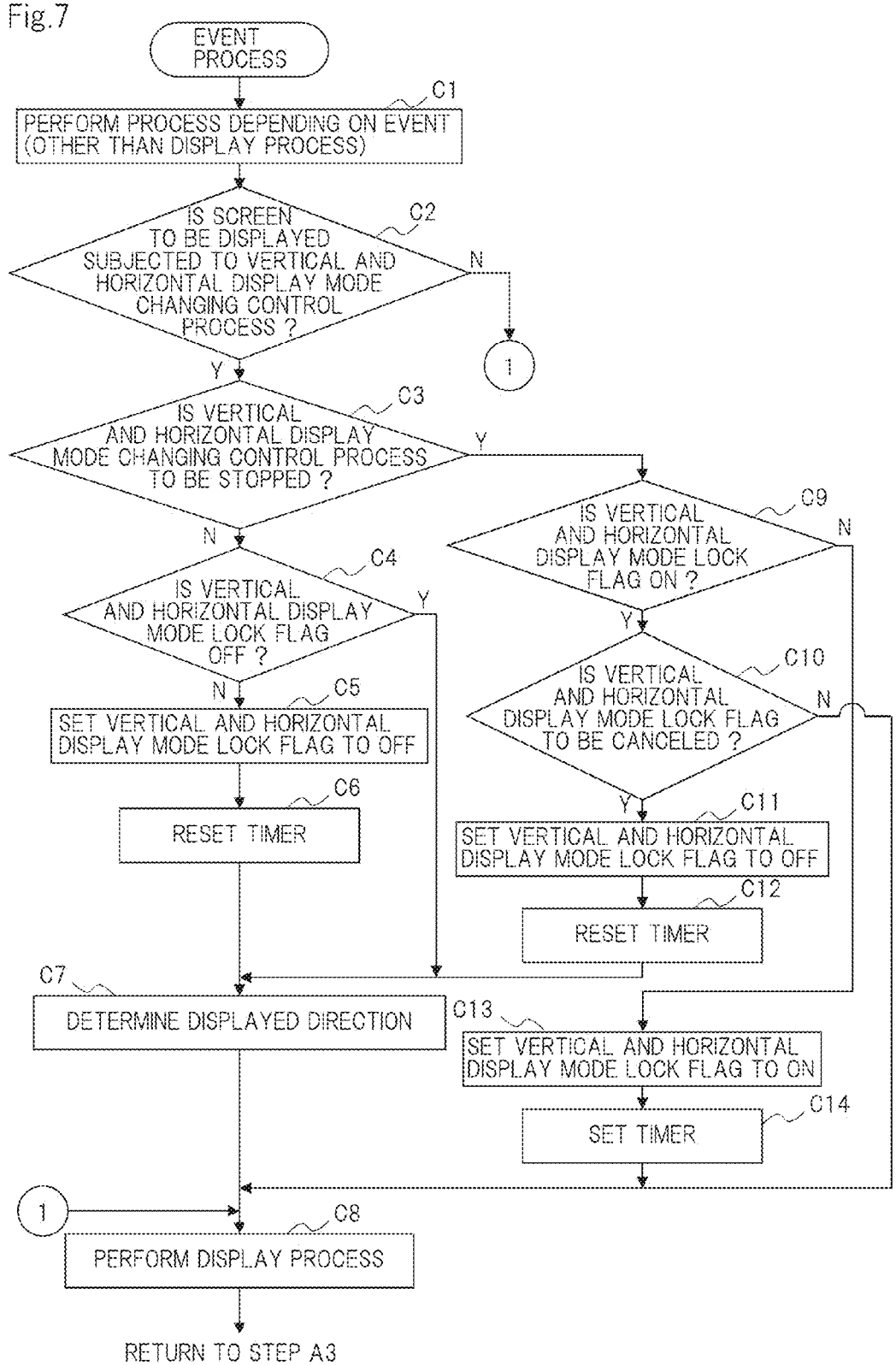

DISPLAY DEVICE, DISPLAY METHOD, PROGRAM

CROSS-REFERENCE TO RELATED APPLICATIONS

This application is a national stage application of International Application No. PCT/JP2012/054053 entitled "Display Device, Display Method, Program," filed on Feb. 21, 2012, which claims the benefit of the priority of Japanese Patent Application No. 2011-084468, filed on Apr. 6, 2011, the disclosures of each of which are hereby incorporated by reference in their entirety.

FIELD OF THE INVENTION

The present invention relates to a display device, a display method, and a program.

BACKGROUND ART

Patent document 1 discloses a technology for detecting the acceleration of a mobile terminal, judging the posture of the mobile terminal based on the detected acceleration, and changing the displayed direction of a screen that is being displayed on a display unit based on the judged posture.

The mobile terminal disclosed in Patent document 1 is occasionally liable to have the displayed direction of the screen changed suddenly because it tends to detect an unintended acceleration on account of shaking of the mobile terminal (due to shaking of the hand carrying the mobile terminal, and operation of the vibrator) and external causes (due to operation of the mobile terminal on a vehicle).

If the user is simply viewing the screen at this time, then the user can view the screen in the original displayed direction by moving the mobile terminal back to its original posture. However, if the user is operating the mobile terminal, the user is likely to make a mistake because of the sudden change of the displayed direction of the screen.

Patent document 2 discloses a technology for stopping the displayed direction of the screen from changing while the user is speaking on the mobile terminal. However, the technology is unable to stop the displayed direction of the screen from changing at other times than while the user is speaking on the mobile terminal.

PRIOR TECHNICAL DOCUMENTS

Patent Document

Patent document 1: JP2004-240878A
Patent document 2: JP2010-263433A

SUMMARY OF THE INVENTION

Problems to be Solved by the Invention

As described above, the mobile terminals according to the background art are problematic in that they fail to prevent the displayed direction of the screen from changing suddenly while the user is operating the mobile terminal.

It is an object of the present invention to provide a display device, a display method, and a program which are capable of solving the above problems.

Means for Solving the Problems

A display device according to the present invention includes:

an input unit that receives an operation instruction;
a display unit that displays a screen;
a changer that changes a displayed direction of the screen displayed by the display unit; and
a stopper that stops the displayed direction of the screen from being changed by the changer if the input unit has received an operation instruction about information on the screen displayed by the display unit.

A display method according to the present invention, to be carried out by a display device that displays a screen and changes a displayed direction of the screen, comprises:

stopping the displayed direction of the screen from being changed if an operation instruction about information on the screen has been received.

A program according to the present invention enables a display device that displays a screen and changes a displayed direction of the screen, to perform a sequence to stop the displayed direction of the screen from being changed if an operation instruction about information on the screen has been received.

Advantages of the Invention

According to the present invention, while the user is operating the display device about information on the screen, the displayed direction of the screen is prevented from changing suddenly.

BRIEF DESCRIPTION OF THE DRAWINGS

FIG. 7 is a flowchart of an event processing sequence of the mobile terminal according to the third exemplary embodiment of the invention.

MODE FOR CARRYING OUT THE INVENTION

A mode for carrying out the invention will be described below with reference to the drawings.

(1) First Exemplary Embodiment

Figure 1:
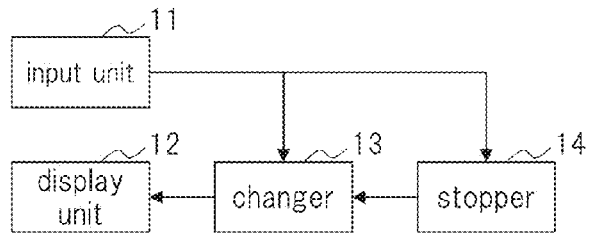
FIG. 1 is a block diagram showing the configuration of a display device according to a first exemplary embodiment of the invention.

FIG. 1 is a block diagram showing the configuration of a display device according to a first exemplary embodiment of the invention.

As shown in FIG. 1, the display device according to the present exemplary embodiment includes input unit 11, display unit 12, changer 13, and stopper 14.

Input unit 11 receives operation instructions from the user.

Display unit 12 displays a screen.

Changer 13 changes the displayed direction of the screen displayed by display unit 12 into a vertical display direction for a vertical display mode or a horizontal display direction for a horizontal display mode.

Stopper 14 stops the displayed direction of the screen from being changed by changer 13 when input unit 11 receives an operation instruction about information on the screen displayed by display unit 12. The information on the screen refers to a document, an image, a menu, an icon, and the like, for example. The operation instruction about information on the screen refers to an instruction about any of all operations for information displayed on the screen, e.g., an operation for scrolling a document and an image, an operation for editing a document and an image, and an operation for selecting a menu and an icon.

As described above, the display device according to the present exemplary embodiment stops the displayed direction of the screen from being changed by changer 13 when it receives an operation instruction about information on the screen displayed by display unit 12.

Therefore, while the user is operating the display device about information on the screen, the displayed direction of the screen is prevented from changing suddenly, thus preventing the user from making a mistake in operating the display device.

Advantages of the present exemplary embodiment will be described in specific detail below.

When the display device displays a document, for example, alternatively in the vertical display mode and the horizontal display mode, the document has different numbers of characters per line displayed in the vertical display mode and the horizontal display mode. Therefore, switching between the vertical display mode and the horizontal display mode makes the document displayed in different states.

Consequently, if switching occurs between the vertical display mode and the horizontal display mode when the user is to select or enter a character on a line in a document, while editing the document, then since the line that the user is working on changes its position, the user tends to make a mistake by selecting or entering the wrong character.

According to the present exemplary embodiment, however, because the displayed state of the document is prevented from changing while the user is editing the document, the user is prevented from making a mistake by selecting or entering a wrong character.

(2) Second Exemplary Embodiment

The present exemplary embodiment is concerned with a more specific representation of the configuration and operation of the first exemplary embodiment, wherein the display device according to the present invention is applied to a mobile terminal such as a mobile phone or smart phone.

Figure 2:
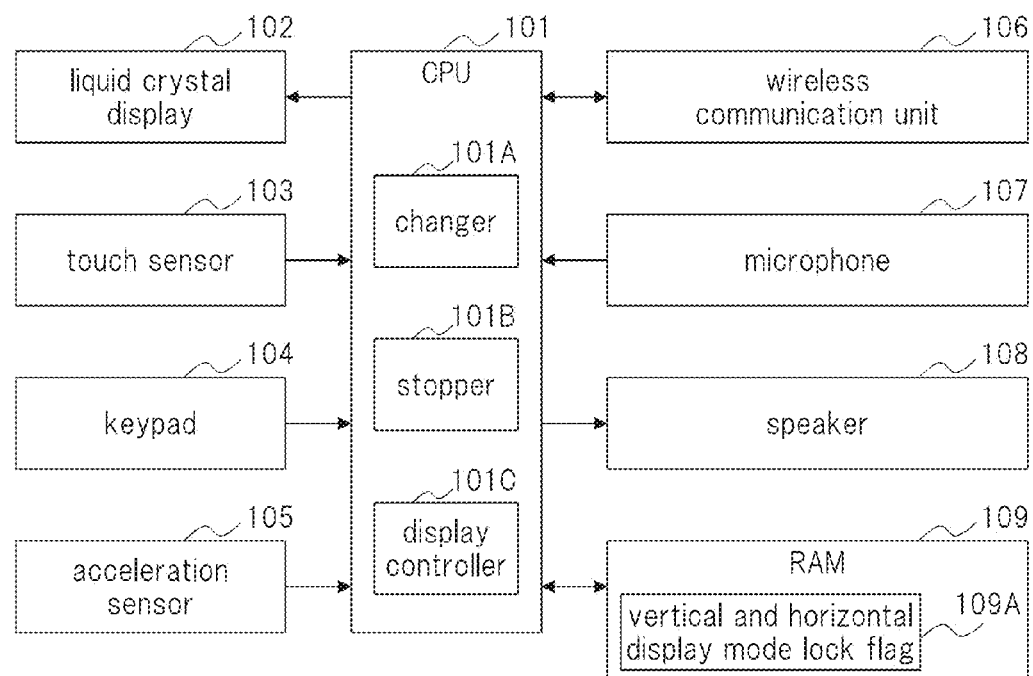
FIG. 2 is a block diagram showing the configuration of mobile terminals according to second and third exemplary embodiments of the invention.

FIG. 2 is a block diagram showing the configuration of a mobile terminal as a display device according to the second exemplary embodiment of the invention.

As shown in FIG. 2, the mobile terminal according to the present second exemplary embodiment includes CPU (Central Processing Unit) 101, liquid crystal display 102, touch sensor 103, keypad 104, acceleration sensor 105, wireless communication unit 106, microphone 107, speaker 108, and RAM (Random Access Memory) 109.

Liquid crystal display 102, which corresponds to display unit 12 shown in FIG. 1, displays a screen.

Touch sensor 103 and keypad 104 correspond to the components of input unit 11 shown in FIG. 1.

Touch sensor 103 detects the position where a finger or the like of the user has touched touch sensor 103, and receives an operation instruction depending on the detected position.

Keypad 104 includes one or more keys, and receives an operation instruction depending on the key depressed by the user.

Acceleration sensor 105 detects the acceleration of the mobile terminal.

Wireless communication unit 106 performs wireless communications. For example, wireless communication unit 106 sends and receives call speech via a wireless link.

Microphone 107 picks up speech (e.g., call speech).

Speaker 108 outputs speech (e.g., call speech).

CPU 101, which is a part for controlling the mobile terminal in its entirety, includes changer 101A that corresponds to changer 103 shown in FIG. 1, stopper 101B that corresponds to stopper 14 shown in FIG. 1, and display controller 101C. FIG. 2 shows only characteristic components according to the present invention, among the components of CPU 101, with the other components being omitted from illustration.

Figure 3:
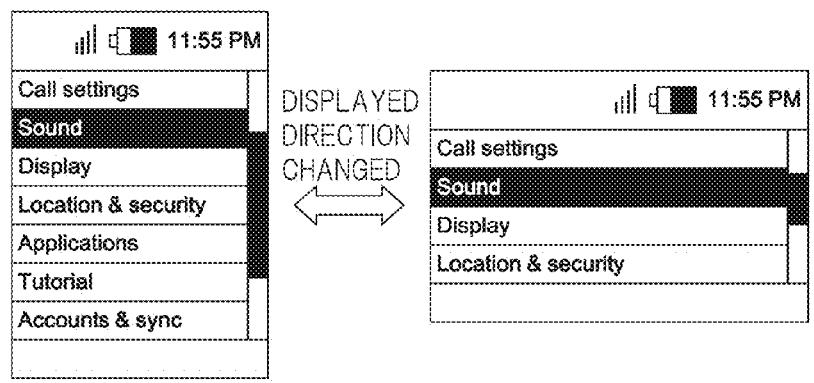
FIG. 3 is a view showing an example in which a menu screen is displayed in a vertical display mode and a horizontal display mode on the mobile terminal according to the second exemplary embodiment of the invention.

Changer 101A judges the posture of the mobile terminal based on the acceleration detected by acceleration sensor 105, and performs a vertical and horizontal display mode changing control process for changing the displayed direction of the screen displayed on the liquid crystal display 102 to the vertical display mode or the horizontal display mode based on the judged posture. FIG. 3 shows an example in which a menu screen is displayed in the vertical display mode and the horizontal display mode.

Stopper 101B stops the vertical and horizontal display mode changing control process from being carried out by changer 101A when touch sensor 103 or keypad 104 receives an operation instruction about information on the screen displayed by liquid crystal display 102. The information on the screen refers to a document, an image, a menu, an icon, and the like, for example. The operation instruction about information on the screen refers to an instruction about any of all operations for information displayed on the screen, e.g., an operation for scrolling a document and an image, an operation for editing a document and an image, and an operation for selecting a menu and an icon.

Specifically, when stopper 101B stops the vertical and horizontal display mode changing control process, it sets vertical and horizontal display mode lock flag 109A, which is stored in RAM 109 and which serves to temporarily disable the vertical and horizontal display mode changing control process, to ON.

When vertical and horizontal display mode lock flag 109A is ON, changer 101A temporarily stops the vertical and horizontal display mode changing control process, and maintains the present display state (the vertical display mode or the horizontal display mode). Initially, vertical and horizontal display mode lock flag 109A is set to OFF.

Display controller 101C controls changer 101A and stopper 101B.

RAM 109 is a storage unit for storing vertical and horizontal display mode lock flag 109A, etc.

Operation of the mobile terminal according to the present exemplary embodiment will be described below.

First, overall operation of the mobile terminal according to the present exemplary embodiment will be described below with reference to FIG. 4.

Figure 4:
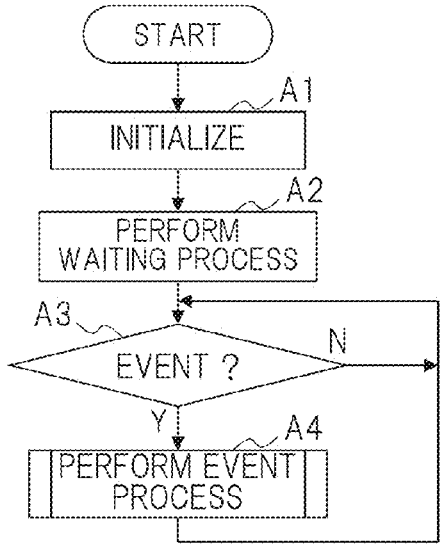
FIG. 4 is a flowchart of an overall operation sequence of the mobile terminals according to the second and third exemplary embodiments of the invention.

As shown in FIG. 4, CPU 101 initializes the mobile terminal (step A1). At this time, vertical and horizontal display mode lock flag 109A is set to OFF.

Then, CPU 101 performs a standby process for making wireless communication unit 106 transit to a standby state (step A2).

Subsequently, CPU 101 stands by for various events (step A3). The events refer to an event for receiving an operation instruction from the user, an incoming event for wireless communication unit 106 to receive an incoming telephone call, etc.

Thereafter, if an event has occurred (Yes in step A3), then CPU 101 performs an event process depending on the event that has occurred (step A4).

The event process in step A4 shown in FIG. 4 will be described in detail below with reference to the flowchart shown in FIG. 5.

Figure 5:
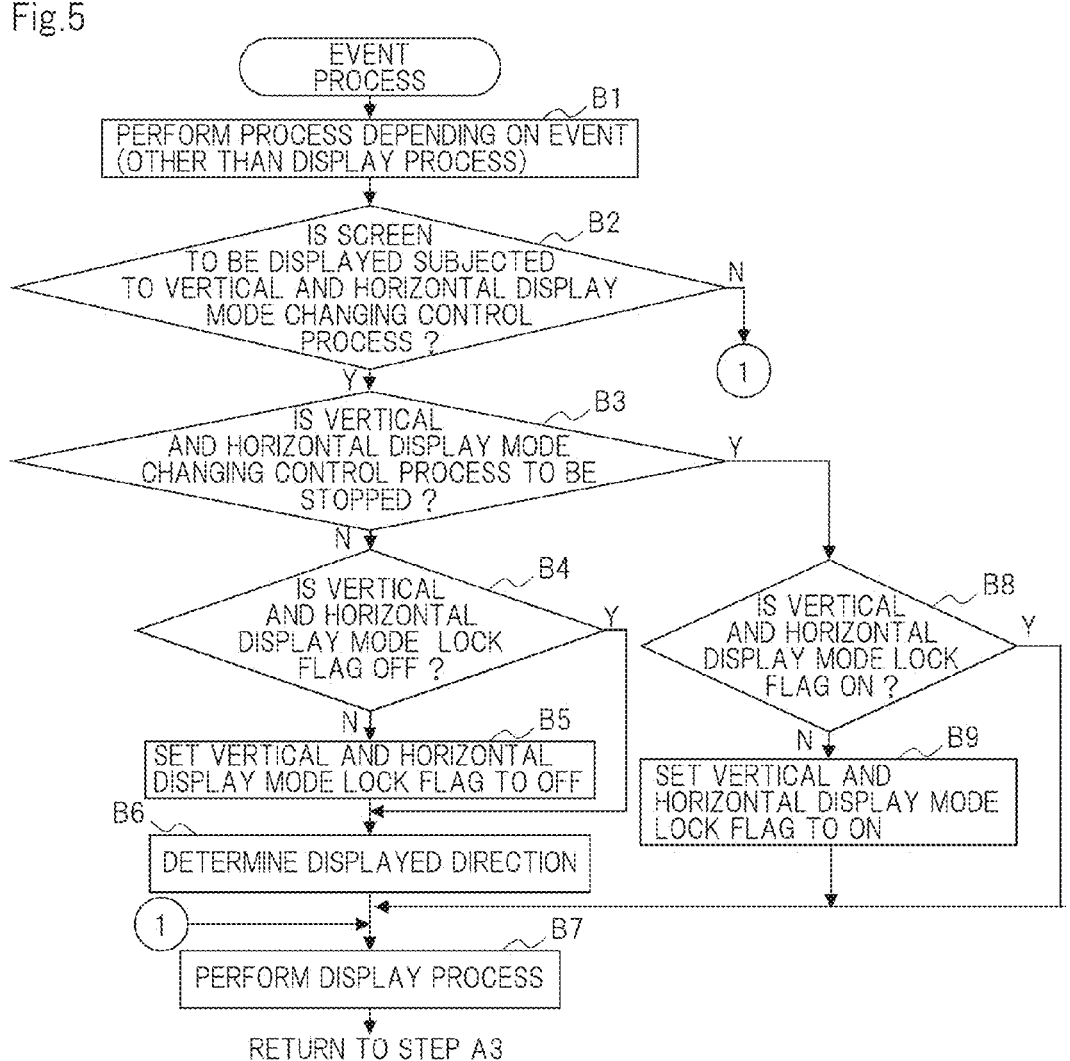
FIG. 5 is a flowchart of an event processing sequence of the mobile terminal according to the second exemplary embodiment of the invention.

As shown in FIG. 5, in the event process, CPU 101 first performs an internal process other than a display process (step B1).

Then, display controller 101C of CPU 101 judges whether or not a screen to be displayed on liquid crystal display 102 is a screen to be subjected to the vertical and horizontal display mode changing control process (step B2). A screen to be subjected to the vertical and horizontal display mode changing control process refers to a screen for displaying a document or an image, a menu image shown in FIG. 3, or the like.

If a screen to be displayed on liquid crystal display 102 is not a screen to be subjected to the vertical and horizontal display mode changing control process (No in step B2), then changer 101A of CPU 101 displays the screen in a predetermined direction on liquid crystal display 102 (step B7).

If a screen to be displayed on liquid crystal display 102 is a screen to be subjected to the vertical and horizontal display mode changing control process (Yes in step B2), then stopper 101B of CPU 101 judges whether or not the vertical and horizontal display mode changing control process is to be temporarily stopped (step B3).

If the event which has currently been occurring is an event with respect to which an operation instruction about information on the screen displayed on liquid crystal display 102 has been received from the user, for example, then stopper 101B judges that the vertical and horizontal display mode changing control process is to be stopped in step B3.

The event which has currently been occurring may be an event with respect to which an operation instruction for making the screen displayed on liquid crystal display 102 transit has been received from the user. The operation instruction for making the screen transit refers to an operation instruction to close the present screen, an operation instruction to finalize a selected menu or icon (after the selected menu or icon is finalized, the screen transits to a screen depending on the selected menu or icon), or an operation instruction to return to the previous screen.

When the operation instruction for making the screen transit has been received, unlike the editing of the document as described in the first exemplary embodiment, it is considered that the user will not perform the operation performed on the screen prior to the operation in the screen subsequent to the operation, and will make no mistake even if the displayed state changes.

If an event with respect to which the operation instruction for making the screen transit has been received has occurred, therefore, stopper 101B judges that the vertical and horizontal display mode changing control process is not to be stopped.

If the event which has currently been occurring is an incoming call event, then since the screen will subsequently transit to a screen depending on the event, it is considered that the user will make no mistake.

Therefore, if an incoming call event has occurred, then stopper 101B judges that the vertical and horizontal display mode changing control process is not to be stopped.

If the vertical and horizontal display mode changing control process is not to be stopped (No in step B3), and if vertical and horizontal display mode lock flag 109A is not OFF (No in step B4), then stopper 101B sets vertical and horizontal display mode lock flag 109A to OFF (step B5). Changer 101A then judges the posture of the mobile terminal based on the acceleration detected by acceleration sensor 105, determines the displayed direction of the screen on liquid crystal display 102 as the vertical display mode or the horizontal display mode based on the judged posture (step B6), and displays the screen on liquid crystal display 102 in the determined displayed direction (step B7).

If the vertical and horizontal display mode changing control process is to be stopped (Yes in step B3), and if vertical and horizontal display mode lock flag 109A is not ON (No in step B8), then stopper 101B sets vertical and horizontal display mode lock flag 109A to ON (step B9). Changer 101A then maintains the present displayed direction on liquid crystal display 102, and displays the screen on liquid crystal display 102 (step B7).

As described above, the mobile terminal according to the present exemplary embodiment stops the vertical and horizontal display mode changing control process from being performed by changer 101A if an event occurs with respect to which an operation instruction about information on the screen displayed on liquid crystal display 102 is received.

Therefore, inasmuch as the displayed direction of the screen is prevented from changing suddenly, while the user is operating the mobile terminal with respect to the information on the screen, the user is prevented from making a mistake in operating the mobile terminal.

Even if the vertical and horizontal display mode changing control process is stopped, the mobile terminal according to the present exemplary embodiment resumes the vertical and horizontal display mode changing control process when an event other than the above event subsequently occurs. Therefore, the user can intentionally change the displayed direction of the screen to the vertical display mode or the horizontal display mode.

(3) Third Exemplary Embodiment

A mobile terminal according to the present exemplary embodiment is different from the mobile terminal according to the second exemplary embodiment in that the functions described below are added. The mobile terminal according to the present exemplary embodiment is of the same configuration as the mobile terminal according to the second exemplary embodiment (FIG. 2).

Figure 6:
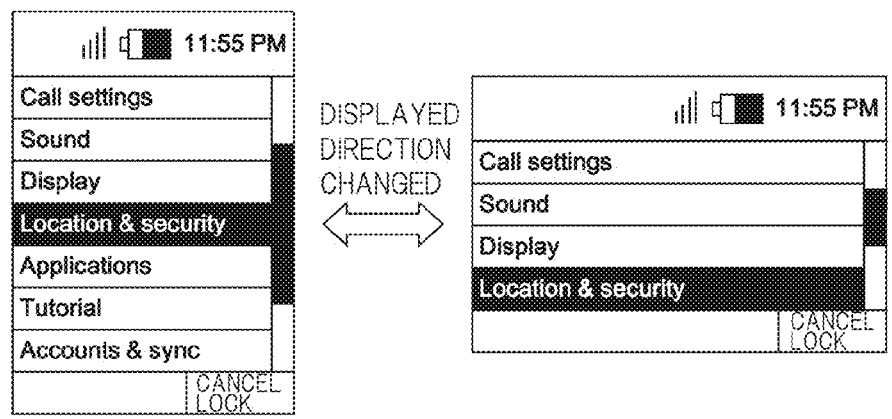
FIG. 6 is a view showing an example in which a menu screen is displayed in a vertical display mode and a horizontal display mode on the mobile terminal according to the third exemplary embodiment of the invention.

The mobile terminal according to the present exemplary embodiment additionally has the function to allow the user to give an operation instruction to resume the vertical and horizontal display mode changing control process if the vertical and horizontal display mode changing control process is stopped (vertical and horizontal display mode lock flag 109A is ON). For example, as shown in FIG. 6, the menu screen includes a "CANCEL LOCK" menu. When the "CANCEL LOCK" menu is selected, stopper 101B sets the vertical and horizontal display mode changing control process to OFF.

According to the present exemplary embodiment, furthermore, the mobile terminal has an additional function to resume the vertical and horizontal display mode changing control process upon elapse of a predetermined period of time after the vertical and horizontal display mode changing control process has been stopped.

Operation of the mobile terminal according to the present exemplary embodiment will be described below.

The mobile terminal according to the present exemplary embodiment has the same overall operation (FIG. 4) as the mobile terminal according to the second exemplary embodiment, but is different therefrom as to operation in the event process. Operation only in the event process will be described below with reference to a flowchart shown in FIG. 7.

As shown in FIG. 7, in the event process, steps C1 through C3 which are identical to steps B1 through B3 according to the second exemplary embodiment (FIG. 5) are carried out.

If the vertical and horizontal display mode changing control process is not to be stopped (No in step C3), and if vertical and horizontal display mode lock flag 109A is not OFF (No in step C4), then stopper 101B sets vertical and horizontal display mode lock flag 109A to OFF (step C5), and then resets a timer, not shown (step C6). The timer may be installed anywhere in the mobile terminal. Then, steps C7, C8 which are identical to steps B6, B7 according to the second exemplary embodiment (FIG. 5) are carried out.

If the vertical and horizontal display mode changing control process is to be stopped (Yes in step C3), and if vertical and horizontal display mode lock flag 109A is not ON (No in step C9), then stopper 101B sets vertical and horizontal display mode lock flag 109A to ON (step C13), and then sets the timer (step C14). The timer may be installed anywhere in the mobile terminal. Then, steps C7, C8 which are identical to steps B6, B7 according to the second exemplary embodiment (FIG. 5) are carried out. Then, step C8 which is identical to step B7 according to the second exemplary embodiment (FIG. 5) is carried out.

If vertical and horizontal display mode lock flag 109A is ON (Yes in step C9), then stopper 101B judges whether or not vertical and horizontal display mode lock flag 109A is to be canceled from ON to OFF (step C10).

In step C10, if the event which has currently been occurring is an event with respect to which an operation instruction for selecting the "CANCEL LOCK" menu shown in FIG. 6 has been received from the user (the selection of the "CANCEL LOCK" menu does not make the screen transit, but is judged as "Yes" in step C3), or indicates that the timer set when vertical and horizontal display mode lock flag 109A is set to ON has elapsed by a predetermined period of time, then stopper 101B judges that vertical and horizontal display mode lock flag 109A is to be canceled.

If vertical and horizontal display mode lock flag 109A is to be canceled (Yes in step C10), then stopper 101B sets vertical and horizontal display mode lock flag 109A to OFF (step C11), and resets the timer (step C12). Then, steps C7, C8 which are identical to steps B6, B7 according to the second exemplary embodiment (FIG. 5) are carried out.

If vertical and horizontal display mode lock flag 109A is not to be canceled (No in step C10), then step C8 which is identical to step B7 according to the second exemplary embodiment (FIG. 5) is carried out.

As described above, even if the vertical and horizontal display mode changing control process of changer 101A is stopped (vertical and horizontal display mode lock flag 109A is ON), the mobile terminal according to the present exemplary embodiment sets vertical and horizontal display mode lock flag 109A to OFF and resumes the vertical and horizontal display mode changing control process in response to the operation of the user or upon elapse to a predetermined period of time.

Other advantages are the same as those of the second exemplary embodiment.

Although the present invention has been described above with respect to the exemplary embodiments, the present invention is not limited to the above exemplary embodiments. Various changes and modifications that can be understood by those skilled in the art may be made to the configurations and details of the present invention within the scope of the present invention.

For example, a mobile phone or a smart phone has been described as an example of the display device according to the present invention in the above exemplary embodiments. The present invention is not limited to such a mobile phone or a smart phone, but is also applicable to a game machine, a tablet PC (Personal Computer), a laptop computer, or the like.

In the third exemplary embodiment, the "CANCEL LOCK" menu is included in the menu screen. However, the present invention is not limited to the "CANCEL LOCK" menu, but a physical "CANCEL LOCK" button may be mounted on the housing of the display device, or "CANCEL LOCK" may be selected and finalized when one of the keys of keypad 14 is pressed.

The method carried out by the display device according to the present invention may be applied to a program to be executed by a computer. Such a program may be stored in a storage medium or may be made available to an external entity through a network.

This application is based upon and claims the benefit of priority from Japanese Patent Application No. 2011-084468 filed on Apr. 6, 2011, the entire disclosure of which is incorporated herein by reference.

The invention claimed is:

1. A display device comprising:
a touch sensor that receives an operation instruction;
a display that displays a screen that shows information;
a processor coupled to the touch sensor and display,
  wherein the processor is configured to execute program instructions to cause the processor to:
  change a first direction of the screen that is being displayed by said display to a second direction that is different from the first direction;
  continue changing the first direction of the screen that is being displayed to the second direction when said touch sensor has received an operation instruction for making the screen transit, the operation instruction for making the screen transit causing at least one of a present screen to close, a screen corresponding to a selection to open, and a previous screen to re-open; and
  stop the first direction of the screen that is being displayed from being changed to the second direction by said processor automatically when said touch sensor has received an operation instruction about the information on the screen that is being displayed by said display, the operation instruction about the information on the screen that is being displayed including an operation of scrolling the displayed information,
  wherein the received operation instruction about the information on the screen that is being displayed is different from an operation instruction to set a direction of the screen;

wherein, when a time becomes a predetermined period of time, said processor cancels the stopping automatically, and wherein the time is counted by a timer when the processor is stopping the first direction of the screen from being changed to the second direction by said processor.

2. The display device according to claim 1, wherein said processor cancels the stopping of the displayed direction of the screen from being changed by said processor, if said touch sensor has received an operation instruction to cancel the stopping of the displayed direction of the screen from being changed by said processor.

3. A display method to be carried out by a display device that displays a screen and changes a displayed direction of the screen from a first direction to a second direction that is different from the first direction, comprising:

stopping the displayed direction of the screen from being changed automatically from the first direction to the second direction when an operation instruction about information on the screen has been received, the operation instruction about information on the screen including an operation of scrolling the information on the screen, wherein the received operation instruction about information on the screen is different from an operation instruction to set a direction of the screen;

continuing changing the displayed direction of the screen from the first direction to the second direction when an operation instruction for making the screen transit has been received, the operation instruction for making the screen transit causing at least one of a present screen to close, a screen corresponding to a selection to open, and a previous screen to re-open;

counting a period of time while the direction of the screen is stopped from being changed from the first direction to the second direction; and when the period of time becomes a predetermined period of time, cancelling the stopping automatically.

4. The display method according to claim 3, comprising:

canceling the stopping of the displayed direction of the screen from being changed, if an operation instruction to cancel the stopping of the displayed direction of the screen from being changed has been received.

* * * * *